(12) United States Patent
Piao et al.

(10) Patent No.: US 6,629,427 B1
(45) Date of Patent: Oct. 7, 2003

(54) REFRIGERATING SYSTEM

(75) Inventors: Chung-cheng Piao, Osaka (JP); Ryuichi Sakamoto, Osaka (JP); Yuji Watanabe, Osaka (JP); Manabu Yoshimi, Osaka (JP); Kazuo Yonemoto, Osaka (JP)

(73) Assignee: Daikin Industries, Ltd (JP)

( * ) Notice: Subject to any disclaimer, the term of this patent is extended or adjusted under 35 U.S.C. 154(b) by 0 days.

(21) Appl. No.: 09/959,583

(22) PCT Filed: Apr. 7, 2000

(86) PCT No.: PCT/JP00/02307

§ 371 (c)(1),
(2), (4) Date: Oct. 30, 2001

(87) PCT Pub. No.: WO00/66953

PCT Pub. Date: Nov. 9, 2000

(30) Foreign Application Priority Data

Apr. 30, 1999 (JP) ............................................. 11-124514

(51) Int. Cl.$^7$ .............................. F25D 23/00; F25D 9/00
(52) U.S. Cl. ................................. 62/271; 62/402; 62/94
(58) Field of Search ........................... 62/271, 402, 401, 62/86, 87, 88, 94, 513

(56) References Cited

U.S. PATENT DOCUMENTS

| | | | |
|---|---|---|---|
| 4,347,714 A | | 9/1982 | Kinsell et al. |
| 5,121,610 A | * | 6/1992 | Atkinson et al. ............ 62/402 |
| 5,323,624 A | * | 6/1994 | Schwalm ..................... 62/401 |
| 5,373,707 A | | 12/1994 | Ostersetzer et al. |
| 6,301,922 B1 | * | 10/2001 | Ochi ........................... 62/402 |

FOREIGN PATENT DOCUMENTS

| | | | |
|---|---|---|---|
| GB | 2237372 | | 5/1991 |
| JP | 59-81460 | | 5/1984 |
| JP | 62-223573 | | 10/1987 |
| JP | 2-187542 | | 7/1990 |
| JP | 3-79977 | | 4/1991 |
| JP | 5-238489 | | 9/1993 |
| JP | 8-318731 | | 12/1996 |
| WO | WO99/17065 | * | 4/1999 |

OTHER PUBLICATIONS

Japan Society of Refrigerating and Air Conditioning Engineers, "Shin–ban Reito–Kucho–Binran Dai–4–han Kiso–hen", Japan Society of Refrigerating and Air Conditioning Engineers, pp. 45–48, 1981 along with a Partial English Translation.

* cited by examiner

Primary Examiner—Chen Wen Jiang
(74) Attorney, Agent, or Firm—Nixon & Peabody LLP; Donald R. Studebaker

(57) ABSTRACT

A cyclic circuit (20) is constructed by sequentially connecting an expander (22), a heat exchanger (30) and a compressor (21). A dehumidifying mechanism (60) is provided for dehumidifying a heat-absorbing air taken in through an inlet duct (23). An internal heat exchanger (15) is provided for cooling the dehumidified heat-absorbing air and then supplying it to the expander (22). The heat-absorbing air expands in the expander (22) to reduce its temperature. Since the heat-absorbing air has been dehumidified in advance, the moisture thereof does not condense during the expansion thereof. The heat-absorbing air having reached a low temperature through expansion flows into the heat exchanger (30) and absorbs heat from a room air therein. Thereafter, the heat-absorbing air is compressed in the compressor (21), regenerates a rotor member (61) and is then discharged.

14 Claims, 7 Drawing Sheets

REFRIGERATING SYSTEM

TECHNICAL FIELD

This invention relates to a refrigerating system using an air cycle.

BACKGROUND ART

A conventional refrigerator operating on an air cycle is disclosed, for example, in "Shin-ban Reito-Kucho-Binran Dai-4-han Kiso-hen" pp. 45–48, published by Japan Society of Refrigerating and Air Conditioning Engineers. Alternatively, an air conditioning system using an air cycle is disclosed in Japanese Unexamined Patent Publication No. 5-238489. With recent growing concern of global environment, attention has been focused on the air cycle according to which refrigeration can be effected without the use of artificial synthetic refrigerant typified by flon refrigerant.

Specifically, the air conditioning system disclosed in the above publication includes a circuit with a construction in which an expander, a heat exchanger and a compressor are sequentially connected so as to operate on an air cycle. A primary air is taken as a working fluid for the air cycle into this circuit. The primary air taken thereinto is pressure-reduced to a sub-atmospheric pressure in the expander and thereby reaches a low temperature. The low-temperature primary air exchanges heat with a secondary air in the heat exchanger. The secondary air is cooled through the heat exchange, and the cooled secondary air is supplied to a room to cool it. The primary air having absorbed heat from the secondary air in the heat exchanger is compressed to an atmospheric pressure in the compressor and then discharged from the circuit.

Further, in the air conditioning system described above, the expander is formed of a turbine and the compressor is formed of a turbo-compressor. Each of impellers of the expander and compressor is coupled to each other through a turbine shaft. The turbine shaft is coupled to a motor, whereby the motor drives the compressor and expander. Furthermore, expansion work of the air during its expansion in the expander is recovered as a driving force for the compressor via the turbine shaft.

Problems to be Solved

In the system described in the above publication, the intake air is expanded in the expander as it is. Therefore, while the air expands in the expander, moisture condenses in the air. In other words, part of expansion work of the air during expansion is taken by the moisture as its heat of condensation. Accordingly, the system has the problem in that expansion work of the air in the expander cannot sufficiently be recovered. Also, such insufficient recovery of expansion work presents another problem of increasing power for driving the compressor and thereby resulting in a reduction of COP (coefficient of performance).

The present invention has been made in view of these problems and therefore has its object of enhancing the COP by reducing required power for air compression in a refrigerating system using an air cycle.

DISCLOSURE OF INVENTION

A first solution taken in the invention is directed to a refrigerating system for cooling a subject to be cooled. The system is provided with an air cycle part (11) for taking in a heat-absorbing air, reducing the pressure of the heat-absorbing air and compressing the heat-absorbing air having absorbed heat from the subject to be cooled after the pressure reduction thereof, and dehumidifying means (60) for dehumidifying the heat-absorbing air and then supplying the heat-absorbing air to the air cycle part (11).

A second solution taken in the invention is directed to a refrigerating system for cooling a subject to be cooled. The system is provided with: an air cycle part (11) including an expander (22) for taking in a heat-absorbing air and reducing the pressure of the heat-absorbing air, a heat absorbing section (30) in which the heat-absorbing air reduced in pressure in the expander (22) absorbs heat from the subject to be cooled, and a compressor (21) for compressing the heat-absorbing air having absorbed heat in the heat absorbing section (30); and dehumidifying means (60) for dehumidifying the heat-absorbing air and then supplying the heat-absorbing air to the expander (22) of the air cycle part (11).

A third solution taken in the invention is based on the first or second solution, and provided with an internal heat exchanger (15) for heat-exchanging the heat-absorbing air which has been dehumidified in the dehumidifying means (60) and is being supplied to the air cycle part (11) with the heat-absorbing air in reduced pressure condition having absorbed heat from the subject to be cooled.

A fourth solution taken in the invention is based on the third solution, wherein the internal heat exchanger (15) is arranged to supply moisture to the heat-absorbing air in reduced pressure condition having absorbed heat from the subject to be cooled and use latent heat of evaporation of the moisture to cool the heat-absorbing air being supplied to the air cycle part (11).

A fifth solution taken in the invention is based on any one of the first to fourth solutions and provided with humidifying/cooling means (90) for cooling by humidification the heat-absorbing air reduced in pressure in the air cycle part (11), wherein the air cycle part (11) is arranged so that the heat-absorbing air cooled in the humidifying/cooling means (90) absorbs heat from the subject to be cooled.

A sixth solution taken in the invention is based on any one of the first to fifth solutions, wherein the air cycle part (11) is arranged to supply moisture to the heat-absorbing air absorbing heat from the subject to be cooled and use latent heat of evaporation of the moisture for heat absorption from the subject to be cooled.

A seventh solution taken in the invention is based on any one of the first to sixth solutions, wherein the air cycle part (11) is arranged to provide heat absorption from an air to be cooled as the subject to be cooled, supply moisture having condensed in the air to be cooled to the heat-absorbing air absorbing heat from the air to be cooled and use latent heat of evaporation of the moisture for heat absorption from the air to be cooled.

An eighth solution taken in the invention is based on the second solution, wherein the air cycle part (11) is arranged to provide heat absorption from an air to be cooled as the subject to be cooled in the heat absorbing section (30), and the heat absorbing section (30) is arranged to separate the air to be cooled from the heat-absorbing air by a moisture-permeable partition, supply moisture having condensed in the air to be cooled to the heat-absorbing air based on a pressure difference developed across the partition and use latent heat of evaporation of the moisture for heat absorption from the air to be cooled.

A ninth solution taken in the invention is based on any one of the first to eighth solutions and provided with water supply means (99) for supplying moisture to the heat-absorbing air so that the moisture evaporates in the heat-absorbing air being compressed in the air cycle part (11).

A tenth solution taken in the invention is based on any one of the first to ninth solutions, wherein the air cycle part (11) is arranged to operate in a mode of effecting an air cycle operation so that the heat-absorbing air in reduced pressure condition absorbs heat from the subject to be cooled and another mode in which the air cycle operation is stopped and the taken heat-absorbing air in normal pressure condition absorbs heat from the subject to be cooled.

An eleventh solution taken in the invention is based on any one of the first to tenth solutions, wherein the dehumidifying means (60) is arranged to include a humidity medium for effecting moisture absorption and release, dehumidify the heat-absorbing air through moisture absorption of the humidity medium and regenerate through moisture release of the humidity medium.

A twelfth solution taken in the invention is based on the eleventh solution, wherein the dehumidifying means (60) is arranged to release moisture to the heat-absorbing air compressed in the air cycle part (11).

A thirteenth solution taken in the invention is based on the twelfth solution, wherein the humidity medium of the dehumidifying means (60) is provided with a solid adsorbent for adsorbing moisture.

A fourteenth solution taken in the invention is based on the thirteenth solution, wherein the humidity medium of the dehumidifying means (60) is formed of a disc-shaped rotor member (61) which is formed to allow air passage in a direction of thickness thereof and brings the passing air into contact with the solid adsorbent, and the dehumidifying means (60) is provided with a moisture absorbing section (62) in which the rotor member (61) absorbs moisture from the heat-absorbing air passing through the rotor member (61), a moisture releasing section (63) in which the rotor member (61) releases moisture to the heat-absorbing air passing through the rotor member (61), and a drive mechanism for rotatively driving the rotor member (61) to allow the rotor member (61) to move between the moisture absorbing section (62) and the moisture releasing section (63).

A fifteenth solution taken in the invention is based on the twelfth solution, wherein the humidity medium of the dehumidifying means (60) comprises a liquid absorbent for absorbing moisture.

A sixteenth solution taken in the invention is based on the fifteenth solution, wherein the dehumidifying means (60) is arranged to heat the liquid absorbent with the heat-absorbing air compressed in the air cycle part (11) to release moisture from the liquid absorbent.

A seventeenth solution taken in the invention is based on the fifteenth solution, wherein the dehumidifying means (60) comprises a circulation circuit (64) that includes a moisture absorbing section (65) in which the liquid absorbent contacts with the heat-absorbing air to absorb moisture therefrom and a moisture releasing section (66) in which the liquid absorbent contacts with the heat-absorbing air to release moisture thereto, and that circulates the liquid absorbent between the moisture absorbing section (65) and the moisture releasing section (66).

An eighteenth solution taken in the invention is based on the eleventh solution and provided with heating means (101) for heating the heat-absorbing air compressed in the air cycle part (11) and then supplying the heat-absorbing air to the dehumidifying means (60).

A nineteenth solution taken in the invention is based on the eleventh solution and provided with heating means (101) for heating the heat-absorbing air immediately prior to being compressed in the air cycle part (11).

Operations

In the first solution, the dehumidifying means (60) dehumidifies the heat-absorbing air and then supplies it to the air cycle part (11). The air cycle part (11) takes in the dehumidified heat-absorbing air, and operates on an air cycle using this heat-absorbing air as a working fluid. Specifically, the air cycle part (11) reduces the pressure of the heat-absorbing air and then allows the heat-absorbing air reduced in pressure to absorb heat from the subject to be cooled. This heat absorption provides cooling of the subject to be cooled. The heat-absorbing air having absorbed heat is compressed and then discharged from the air cycle part (11). Since the heat-absorbing air taken in by the air cycle part (11) has previously been dehumidified, the heat-absorbing air does not cause moisture condensation when it is being expanded.

In the second solution, the dehumidifying means (60) dehumidifies the heat-absorbing air and then supplies it to the air cycle part (11). The air cycle part (11) takes in the dehumidified heat-absorbing air, and operates on an air cycle using this heat-absorbing air as a working fluid. Specifically, the heat-absorbing air is reduced in pressure in the expander (22). The heat absorbing section (30) allows the heat-absorbing air reduced in pressure to absorb heat from the subject to be cooled. This heat absorption provides cooling of the subject to be cooled. In the compressor (21), the heat-absorbing air having absorbed heat in the heat absorbing section (30) is compressed. The compressed heat-absorbing air is discharged from the air cycle part (11) Since the heat-absorbing air taken in by the air cycle part (11) has previously been dehumidified, the heat-absorbing air does not cause moisture condensation when it is being expanded in the expander (22).

In the third solution, heat exchange is made, in the internal heat exchanger (15), between the heat-absorbing air prior to being supplied to the air cycle part (11) and the heat-absorbing air brought into reduced pressure condition in the air cycle part (11). Though the heat-absorbing air reduced in pressure in the air cycle part (11) absorbs heat from the subject to be cooled, in some cases it still has a lower temperature after heat absorption than that as it had before being supplied to the air cycle part (11). In such cases, the heat exchange in the internal heat exchanger (15) provides reduction in temperature of the heat-absorbing air which will be supplied to the air cycle part (11).

In the fourth solution, moisture is supplied to the heat-absorbing air in reduced pressure condition in the internal heat exchanger (15). The supplied moisture evaporates through heat absorption from the heat-absorbing air prior to being supplied to the air cycle part (11). In other words, latent heat of evaporation of the moisture is used to cool the heat-absorbing air prior to being supplied to the air cycle part (11).

In the fifth solution, the humidifying/cooling means (90) supplies moisture to the heat-absorbing air reduced in pressure in the air cycle part (11). In this case, since the heat-absorbing air has already been humidified in the dehumidifying means (60), it will not be a saturated air even after it is expanded. Accordingly, the moisture evaporates in the heat-absorbing air so that the heat-absorbing air is cooled. In other words, the heat-absorbing air is reduced in temperature through its expansion and then further cooled by the humidifying/cooling means (90). Thereafter, the heat-absorbing air absorbs heat from the subject to be cooled.

In the sixth solution, moisture is supplied to the heat-absorbing air which is absorbing heat from the subject to be cooled in the air cycle part (11). The supplied moisture evaporates through heat absorption from the subject to be cooled. In other words, in the air cycle part (11), both the heat-absorbing air reduced in pressure and the moisture supplied to this heat-absorbing air absorb heat from the subject to be cooled, i.e., latent heat of evaporation of the moisture is also used to cool the subject to be cooled.

In the seventh solution, the air to be cooled is cooled as the subject to be cooled. In the cooled air to be cooled, moisture condenses into a drain. The air cycle part (11) supplies the drain to the heat-absorbing air which has been reduced in pressure and is now absorbing heat from the air to be cooled. The supplied drain evaporates in the heat-absorbing air through heat absorption from the air to be cooled. In other words, in the air cycle part (11), both the heat-absorbing air reduced in pressure and the drain supplied to this heat-absorbing air absorb heat from the air to be cooled, i.e., latent heat of evaporation of the drain is also used to cool the air to be cooled.

In the eighth solution, the air to be cooled is cooled as the subject to be cooled. Specifically, heat exchange is made, in the heat absorbing section (30), between the heat-absorbing air and the air to be cooled with the partition interposed therebetween. In the cooled air to be cooled, moisture condenses into a drain. In the heat absorbing section (30), the heat-absorbing air is in reduced pressure condition, while the air to be cooled is in normal pressure condition. Therefore, the drain permeates the partition due to a pressure difference across the partition and is thereby supplied to the heat-absorbing air in reduced pressure condition.

The supplied drain evaporates in the heat-absorbing air through heat absorption from the air to be cooled. In other words, in the heat absorbing section (30), both the heat-absorbing air reduced in pressure and the drain supplied to the heat-absorbing air absorb heat from the air to be cooled, i.e., latent heat of evaporation of the drain is also used to cool the air to be cooled.

In the ninth solution, the water supply means (99) supplies moisture to the heat-absorbing air. The moisture evaporates in the heat-absorbing air which is being compressed in the air cycle part (11). This moisture evaporation provides reduction in enthalpy of the heat-absorbing air after having been compressed.

In the tenth solution, the system operates in the mode of effecting an air cycle operation and the mode of stopping the air cycle operation. In the former mode, the air cycle part (11) takes in the heat-absorbing air and reduces the pressure thereof, and the heat-absorbing air reduced in pressure absorbs heat from the subject to be cooled. In the latter mode, the air cycle part (11) takes in the heat-absorbing air, and the taken heat-absorbing air absorbs heat from the subject to be cooled without being reduced in pressure.

The mode of stopping the air cycle operation is carried out in the following case. For example, the air cycle part (11) may take in the outdoor air as the heat-absorbing air. Therefore, in conditions where the outside air temperature is low, for example, in winter, cooling the subject to be cooled can often be implemented by using the low-temperature outside air alone without effecting the air cycle operation. Therefore, in such operating conditions, cooling the subject to be cooled is made with the air cycle operation stopped.

In the eleventh solution, the humidity medium of the dehumidifying means (60) absorbs moisture from the heat-absorbing air so that the heat-absorbing air is dehumidified. Further, the humidity medium releases moisture absorbed from the heat-absorbing air. This moisture release provides regeneration of the humidity medium. The regenerated humidity medium absorbs moisture from the heat-absorbing air again.

In the twelfth solution, the humidity medium of the dehumidifying means (60) releases moisture to the heat-absorbing air compressed in the air cycle part (11). This heat-absorbing air is at a high temperature as a result of heat absorption and compression in the air cycle part (11). Accordingly, the humidity medium releases moisture to the high-temperature heat-absorbing air and is thereby regenerated.

In the thirteenth solution, the humidity medium absorbs moisture in a manner that the moisture is adsorbed on the solid adsorbent. Further, the humidity medium releases moisture in a manner that the moisture is desorbed from the solid adsorbent.

In the fourteenth solution, the humidity medium is formed of a disc-shaped rotor member (61). A portion of the rotor member (61) absorbs moisture through contact with the heat-absorbing air in the moisture absorbing section (62). The rotor member (61) is rotatively driven by the drive mechanism so that the portion of the rotor member (61) having absorbed moisture moves to the moisture releasing section (63). In the moisture releasing section (63), the rotor member (61) releases moisture through contact with the heat-absorbing air coming from the air cycle part (11). The rotor member (61) as the humidity medium is thereby regenerated. Thereafter, the regenerated portion of the rotor member (61) moves to the moisture absorbing section (62) again and repeats these actions.

In the fifteenth solution, the humidity medium absorbs moisture in such a manner that the moisture is absorbed in the liquid absorbent. Further, the humidity medium releases moisture in such a manner that the moisture is desorbed from the liquid absorbent.

In the sixteenth solution, the liquid absorbent absorbs moisture from the heat-absorbing air not yet supplied to the air cycle part (11). This liquid absorbent is heated up into an easy-to-release condition by the heat-absorbing air of high temperature compressed in the air cycle part (11), and then released to the heat-absorbing air. This moisture release provides regeneration of the liquid absorbent.

In the seventeenth solution, the liquid absorbent absorbs moisture of the heat-absorbing air in the moisture absorbing section (65), whereby the heat-absorbing air is dehumidified. This liquid absorbent flows through the circulation circuit (64) to reach the moisture releasing section (66). In the moisture releasing section (66), the liquid absorbent releases moisture to the heat-absorbing air coming from the air cycle part (11), whereby the liquid absorbent is regenerated. The regenerated liquid absorbent flows through the circulation circuit (64) to reach the moisture absorbing section (65) again, and repeats this circulation. It is to be noted that in the moisture absorbing section (65) and moisture releasing section (66), the air and the liquid absorbent may be directly contacted with each other or may be indirectly contacted through a moisture permeable membrane or the like.

In the eighteenth solution, the heating means (101) heats the heat-absorbing air compressed in the air cycle part (11). In other words, the heat-absorbing air elevated in temperature by compression is further heated by the heating means (101) to raise its temperature. Thereafter, the heat-absorbing air is supplied to the dehumidifying means (60), and the humidity medium then releases moisture to the heat-absorbing air so as to be regenerated. In other words, the heat supplied to the heat-absorbing air by the heating means (101) is used to regenerate the humidity medium.

In the nineteenth solution, the heating means (101) heats the heat-absorbing air immediately prior to being compressed in the air cycle part (11). The heat-absorbing air heated by the heating means (101) is compressed and then supplied to the dehumidifying means (60). In other words, the heat-absorbing air previously elevated in temperature by heating in the heating means (101) is compressed to further raise its temperature. Then, in the dehumidifying means (60), the humidity medium releases moisture to the heat-absorbing air and is thereby generated. In other words, the heat supplied to the heat-absorbing air by the heating means (101) is used to regenerate the humidity medium.

Effects

According to the present invention, since the heat-absorbing air is dehumidified in advance by the dehumidifying means (60) and then expanded in the air cycle part (11), this prevents moisture condensation in the heat-absorbing air in the course of expansion. Accordingly, it can be avoided that expansion work during expansion of the heat-absorbing air is consumed by moisture condensation, which provides ensured recovery of expansion work. As a result, the recovered expansion work can be utilized for compression of the heat-absorbing air in the air cycle part (11). This reduces required power for compression to enhance the COP.

In the third and fourth solutions, the internal heat exchanger (15) is provided. Accordingly, if the heat-absorbing air after having absorbed heat has a lower temperature than that as it had before expanding, the heat-absorbing air before expanding can be cooled through heat exchange between both the heat-absorbing airs. Therefore, the heat-absorbing air before expanding can be reduced in temperature. In particular, according to the fourth solution, latent heat of evaporation of the moisture can be used to cool the heat-absorbing air before expanding, thereby further reducing the temperature of the heat-absorbing air. As a result, power required for compression of the heat-absorbing air can be reduced and the COP can be further enhanced.

According to the fifth solution, after having been reduced in temperature by expansion, the heat-absorbing air can be further cooled by the humidifying/cooling means (90). And, the heat-absorbing air thus cooled can be used to cool the subject to be cooled. According to the sixth, seventh and eighth solutions, moisture can be supplied to the heat-absorbing air which is absorbing heat from the subject to be cooled. And, latent heat of evaporation of the moisture can be used to cool the subject to be cooled. Therefore, according to each of these solutions, the cooling capacity can be improved merely by moisture supply without increasing required power for compression of the heat-absorbing air. Accordingly, the improvement in cooling capacity provides enhancement in the COP.

Further, according to the seventh and eighth solutions, a drain produced in the air to be cooled as the subject to be cooled can be supplied to the heat-absorbing air, and latent heat of evaporation of the drain can be used to cool the air to be cooled. This eliminates the need for the process of disposing of the drain produced by cooling the air to be cooled, thereby providing simplified construction.

According to the ninth solution, since moisture in the heat-absorbing air in the course of compression is evaporated, the enthalpy of the heat-absorbing air after having been compressed can be reduced. Therefore, an enthalpy differential can be reduced between both the heat-absorbing airs before and after compression, which enables reduction in power required for compression. Accordingly, according to this solution, the COP can be further enhanced.

According to the tenth solution, if the subject to be cooled can be sufficiently cooled without the effecting of the air cycle operation, the system can operate in the mode of stopping the air cycle operation. Therefore, unnecessary air cycle operations can be avoided, which enables reduction in energy required for cooling the subject to be cooled.

According to each of the eleventh to seventeenth solutions, the dehumidifying means (60) can be formed using the humidity medium for providing moisture absorption and release. In particular, according to the twelfth solution, energy possessed by the heat-absorbing air of high temperature coming from the air cycle part (11) can be used to regenerate the humidity medium, thereby providing effective use of energy. Further, according to the thirteenth to seventeenth solutions, the structure of the dehumidifying means (60) can be specified by using the humidity medium such as a solid adsorbent or a liquid absorbent.

According to the eighteenth and nineteenth solutions, heat supplied to the heat-absorbing air by the heating means (101) can be used to regenerate the humidity medium. In this respect, in order to ensure regeneration of the humidity medium, it is necessary to sufficiently elevate the temperature of the heat-absorbing air being supplied from the air cycle part (11) to the dehumidifying means (60) to reduce the relative humidity of the heat-absorbing air. In each of the above embodiments, however, the heat-absorbing air can be heated by the heating means (101). Therefore, the compression ratio of the heat-absorbing air in the air cycle part (11) can be reduced to a small value, while the temperature of the heat-absorbing air after having been compressed can be maintained. Accordingly, the system can reduce required power for compression of the heat-absorbing air while sufficiently regenerating the humidity medium, thereby providing enhancement in the COP.

BEST MODE FOR CARRYING OUT THE INVENTION

Embodiments of the present invention will be hereinafter described with reference to the drawings.

Embodiment 1 of the Invention

Figure 1:
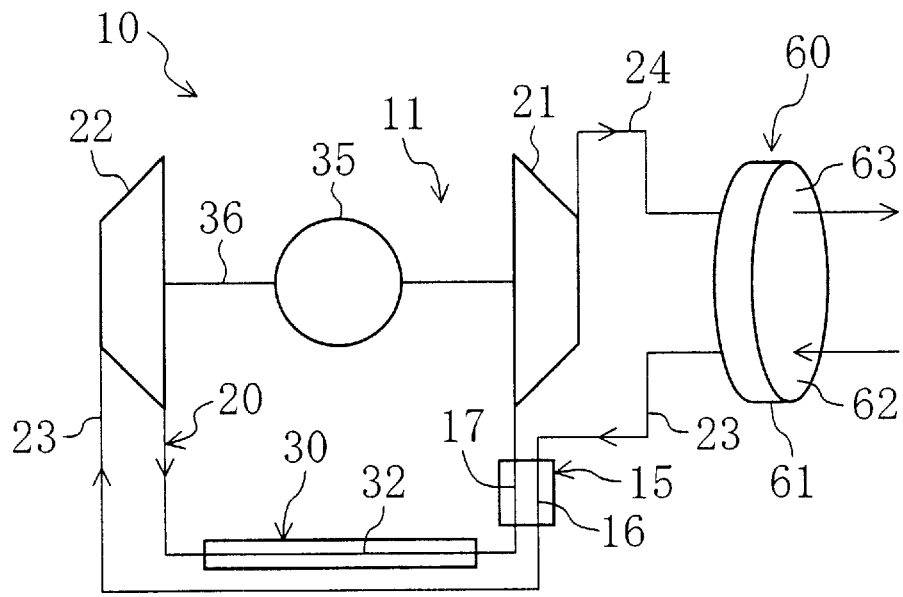
FIG. 1 is a schematic constructional diagram showing the construction of an air conditioning system according to Embodiment 1.

As shown in FIG. 1, a refrigerating system of this embodiment is formed as an air conditioning system (10) for providing cooling for a room by cooling a room air. Therefore, in this embodiment, the room air provides a subject to be cooled, i.e., an air to be cooled. The air conditioning system (10) includes an air cycle part (11), a dehumidifying mechanism (60) as a dehumidifying means, and an internal heat exchanger (15). The air cycle part (11) includes a cyclic circuit (20).

The cyclic circuit (20) is formed by sequentially connecting an expander (22), a heat exchanger (30) as a heat absorber and a compressor (21) through ducts, and is arranged to allow a heat-absorbing air to flow through the circuit and thereby effect air cycle operation. This cyclic circuit (20) includes an inlet duct (23) connected to the inlet side of the expander (22), and an outlet duct (24) connected to the outlet side of the compressor (21). The inlet duct (23) is opened at one end thereof to outdoors to take in an outside air as the heat-absorbing air, and supplies the heat-absorbing air taken therein to the expander (22). The outlet duct (24) is opened at one end thereof to outdoors to discharge the heat-absorbing air coming from the compressor (21) to outdoors.

The compressor (21) and the expander (22) are coupled to each other through a rotating shaft (36). This rotating shaft (36) is connected with a motor (35). The compressor (21) is rotatively driven by the motor (35).

In the heat exchanger (30), a heat absorption side passage (32) is defined. The heat absorption side passage (32) is connected at its one end to the expander (22) through a duct, is connected at the other end to the compressor (21) through a duct, and allows the heat-absorbing air to flow therethrough. Further, the heat exchanger (30) is arranged to provide heat exchange between the heat-absorbing air in the heat absorption side passage (32) and the room air as the air to be cooled.

The dehumidifying mechanism (60) is provided partway in the inlet duct (23) and the outlet duct (24). This dehumidifying mechanism (60) includes a rotor member (61), a moisture absorbing section (62) and a moisture releasing section (63), and is arranged like a so-called rotary-type dehumidifier.

The rotor member (61) has the shape of a disc and is arranged to allow air passage in the direction of its thickness. This rotor member (61) includes a moisture-adsorbable solid adsorbent and constitutes a humidity medium for contacting air passing through it with the solid adsorbent. In addition, the rotor member (61) is connected to a drive motor as a drive mechanism, which is not shown, and rotatively driven by the drive motor to move between the moisture absorbing section (62) and the moisture releasing section (63). The solid adsorbent in the rotor member (61) is made essentially of porous inorganic compound. As this porous inorganic compound, the compound which has a pore diameter in the order of 0.1 nm to 20 nm and adsorbs moisture may be selected.

The moisture absorbing section (62) is placed partway in the inlet duct (23). In the moisture absorbing section (62), the heat-absorbing air in the inlet duct (23) passes through the rotor member (61) so that moisture in the heat-absorbing air is adsorbed on the solid adsorbent of the rotor member (61). The heat-absorbing air is thereby dehumidified.

The moisture releasing section (63) is placed partway in the outlet duct (24). In the moisture releasing section (63), the heat-absorbing air in the outlet duct (24) passes through the rotor member (61) so that moisture adsorbed on the solid adsorbent of the rotor member (61) is desorbed and released into the heat-absorbing air. The solid adsorbent is thereby regenerated.

As described above, the rotor member (61) is driven by the drive motor to move between the moisture absorbing section (62) and the moisture releasing section (63). Specifically, a portion of the rotor member (61) which has taken up moisture from the heat-absorbing air in the moisture absorbing section (62) moves to the moisture releasing section (63) with the rotation of the rotor member (61). In the moisture releasing section (63), the moisture is desorbed from the solid adsorbent of the rotor member (61) so that the solid adsorbent is regenerated. Namely, the rotor member (61) releases the moisture to the heat-absorbing air. Thereafter, the regenerated portion of the rotor member (61) moves to the moisture absorbing section (62) again. The dehumidifying mechanism (60) continuously dehumidifies the heat-absorbing air by repeating the above actions.

The internal heat exchanger (15) is divided into a first passage (16) and a second passage (17). The first passage (16) is connected between the moisture absorbing section (62) and the expander (22) in the inlet duct (23). Through the first passage (16) flows the heat-absorbing air which has been dehumidified by the dehumidifying mechanism (60) and will be then supplied to the expander (22). The second passage (17) is connected between the heat exchanger (30) and the compressor (21) in the cyclic circuit (20). Through the second passage (17) flows the heat-absorbing air in reduced pressure condition which has exchanged heat with the room air in the heat exchanger (30). Further, the internal heat exchanger (15) is arranged to provide heat exchange between the heat-absorbing air in the first passage (16) and the heat-absorbing air in the second passage (17).

Behavior in Operation

Next, behavior of the air conditioning system (10) in operation will be described with reference to the psychrometric chart of FIG. 2.

In the cyclic circuit (20), an outside air in a state of point A is taken as a heat-absorbing air through the inlet duct (23). This heat-absorbing air is dehumidified through contact with the rotor member (61) in the moisture absorbing section (62) of the dehumidifying mechanism (60) and causes reduction in absolute humidity and increase in temperature with an isenthalpic change, so that it changes from the state of point A to a state of point B.

The heat-absorbing air in the state of point B passes through the inlet duct (23) again and flows into the first passage (16) of the internal heat exchanger (15). In the internal heat exchanger (15), the heat-absorbing air in the first passage (16) exchanges heat with the heat-absorbing air in the second passage (17). The heat-absorbing air in the state of point B is cooled in the course of flowing through the first passage (16) to comes to a state of point C.

The heat-absorbing air in the state of point C passes through the inlet duct (23) again and is supplied to the expander (22). In the expander (22), the heat-absorbing air in the state of point C expands to reduce its temperature and pressure with its absolute humidity kept constant, so that it comes to a state of point D.

The heat-absorbing air in the state of point D flows into the heat absorption side passage (32) of the heat exchanger (30), and exchanges heat with the room air in the course of flowing through the heat absorption side passage (32). Thereby, the heat-absorbing air in the state of point D absorbs heat from the room air to increase its temperature and come to a state of point E, while the room air is cooled. This cooling of the room air provides cooling for the room.

The heat-absorbing air in the state of point E flows into the second passage (17) of the internal heat exchanger (15). As described above, in the internal heat exchanger (15), the heat-absorbing air in the first passage (16) exchanges heat with the heat-absorbing air in the second passage (17). Thereby, the heat-absorbing air in the state of point E is heated in the course of flowing through the second passage (17) to come to a state of point F.

The heat-absorbing air in the state of point F is supplied to the compressor (21). In the compressor (21), the heat-absorbing air in the state of point F is compressed to increase its temperature and pressure with its absolute humidity kept constant and come to a state of point G.

The heat-absorbing air in the state of point G passes through the outlet duct (24) and then flows into the moisture releasing section (63) of the dehumidifying mechanism (60). In the moisture releasing section (63), the heat-absorbing air contacts the rotor member (61) so that the rotor member (61) releases moisture to the heat-absorbing air. The heat-absorbing air in the state of point G thereby increases its absolute humidity and reduces its temperature with an isenthalpic change so that it changes from the state of point G to a state of point H. The heat-absorbing air in the state of point H passes through the outlet duct (24) again and is then discharged to outdoors.

In the dehumidifying mechanism (60), the rotor member (61) is driven into rotation. This rotor member (61) thereby moves between the moisture absorbing section (62) and the moisture releasing section (63) to repeat moisture absorption in the moisture absorbing section (62) and moisture release in the moisture releasing section (63). This provides continuous dehumidification of the heat-absorbing air.

Effects of Embodiment

According to Embodiment 1, since the heat-absorbing air is dehumidified in advance by the dehumidifying mechanism (60) and then supplied to the expander (22), this prevents moisture from condensing in the heat-absorbing air in the cause of expansion in the expander (22). As a result, it can be avoided that expansion work during expansion of the heat-absorbing air is consumed by moisture condensation, which provides ensured recovery of expansion work. As described above, the expander (22) and the compressor (21) are coupled to each other through the rotating shaft (36). Accordingly, the expansion work recovered in the expander (22) can be utilized as a rotative driving force for the compressor (21). This reduces the input to the motor (35) to enhance the COP.

Further, in Embodiment 1, the internal heat exchanger (15) is provided. Accordingly, the heat-absorbing air dehumidified in the dehumidifying mechanism (60) can be cooled through heat exchange in the internal heat exchanger (15) before it is supplied to the expander (22). Therefore, the heat-absorbing air at the inlet of the expander (22) can be reduced in temperature, thereby reducing the expansion ratio at the expander (22) while maintaining the temperature of the heat-absorbing air at the outlet of the expander (22). As a result, the compression ratio of the compressor (21) can be reduced, which reduces the input to the motor (35) and further enhances the COP.

Embodiment 2 of the Invention

In Embodiment 2 of the present invention, a water introducing section (42) is provided in addition to the construction of Embodiment 1 described above. Other structures are the same as in Embodiment 1.

Figure 3:
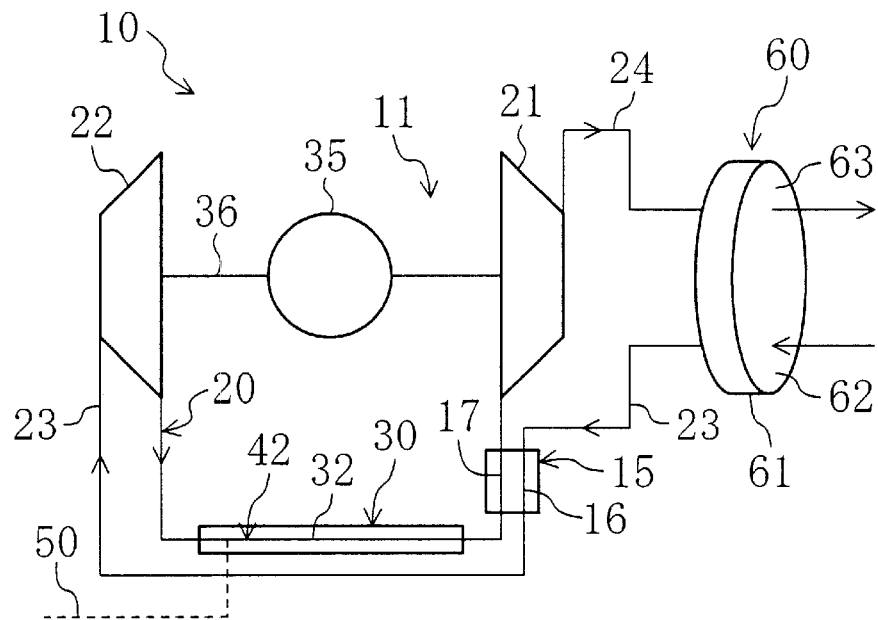
FIG. 3 is a schematic constructional diagram showing the construction of an air conditioning system according to Embodiment 2.

As shown in FIG. 3, the water introducing section (42) is disposed in the heat absorption side passage (32) of the heat exchanger (30). The water introducing section (42) is provided with a permeable membrane capable of permeating moisture, wherein a water side space is formed on one side of the permeable membrane and the side of the permeable membrane opposite to the water side space constitutes the heat absorption side passage (32) of the heat exchanger (30). The water side space is communicated with a water pipe (50) so that city water or the like is supplied thereto. In the water introducing section (42), moisture in the water side space is supplied to the heat-absorbing air in the heat absorption side passage (32) by the permeation through the permeable membrane.

As described above, the water introducing section (42) supplies moisture to the heat-absorbing air in the heat absorption side passage (32). Accordingly, in the heat absorption side passage (32), the heat-absorbing air absorbs heat from the room air and at the same time the moisture supplied to the heat-absorbing air also absorbs heat from the room air to evaporate. In other words, the water introducing section (42) constitutes a moisture supplying means for supplying moisture to the heat-absorbing air in the heat absorption side passage (32) in order to use latent heat of evaporation to cool the room air.

Behavior in Operation

Figure 4:
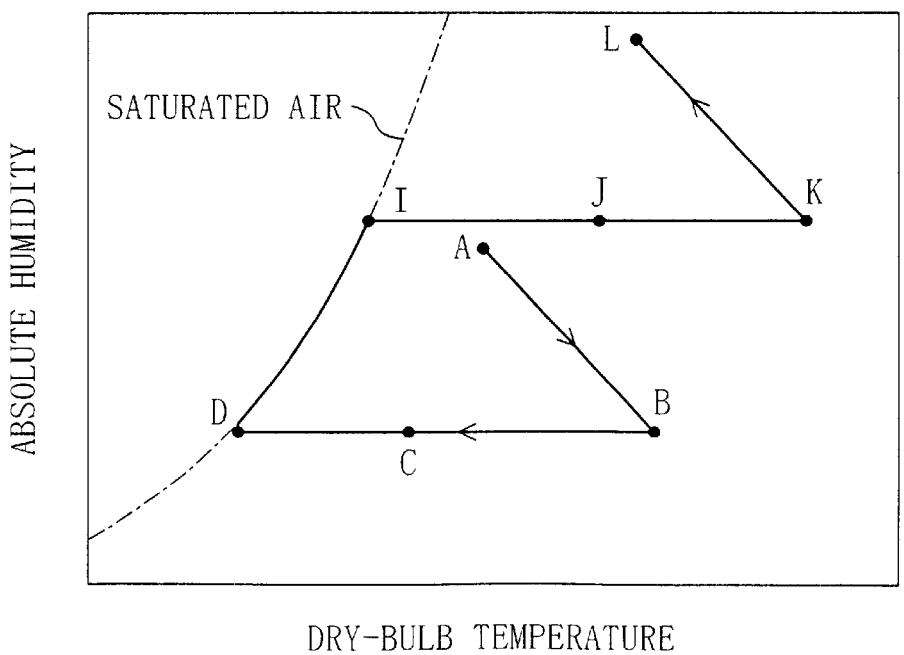
FIG. 4 is a psychrometric chart showing behavior of the air conditioning system according to Embodiment 2.

Next, behavior of the air conditioning system (10) in operation will be described with reference to the psychrometric chart of FIG. 4. It is to be noted that in FIG. 4, the same reference characters as designated in FIG. 2 represent the same states.

In the cyclic circuit (20), an outside air in a state of point A is taken as a heat-absorbing air through the inlet duct (23). This heat-absorbing air comes to a state of point D via respective states of points B and C, like Embodiment 1. That is, the heat-absorbing air in the state of point A is dehumidified in the dehumidifying mechanism (60) to come to the state of point B, cooled in the internal exchanger (15) to come to the state of point C, and expanded in the expander (22) to come to the state of point D.

The heat-absorbing air in the state of point D flows into the heat absorption side passage (32) of the heat exchanger (30), and exchanges heat with the room air in the course of flowing through the heat absorption side passage (32). Further, the heat-absorbing air in the heat absorption side passage (32) is supplied with moisture from the water introducing section (42), and this moisture evaporates in the heat-absorbing air. Thereby, the heat-absorbing air in the state of point D and the moisture supplied to the heat-absorbing air absorb heat from the room air so that the room air is cooled. This cooling of the room air provides cooling for the room. In the meantime, the heat-absorbing air in the state of point D becomes a saturated air through the heat absorption and moisture evaporation, and then increases its absolute humidity and temperature while maintaining the condition of a saturated air to reach a state of point I.

Figure 2:
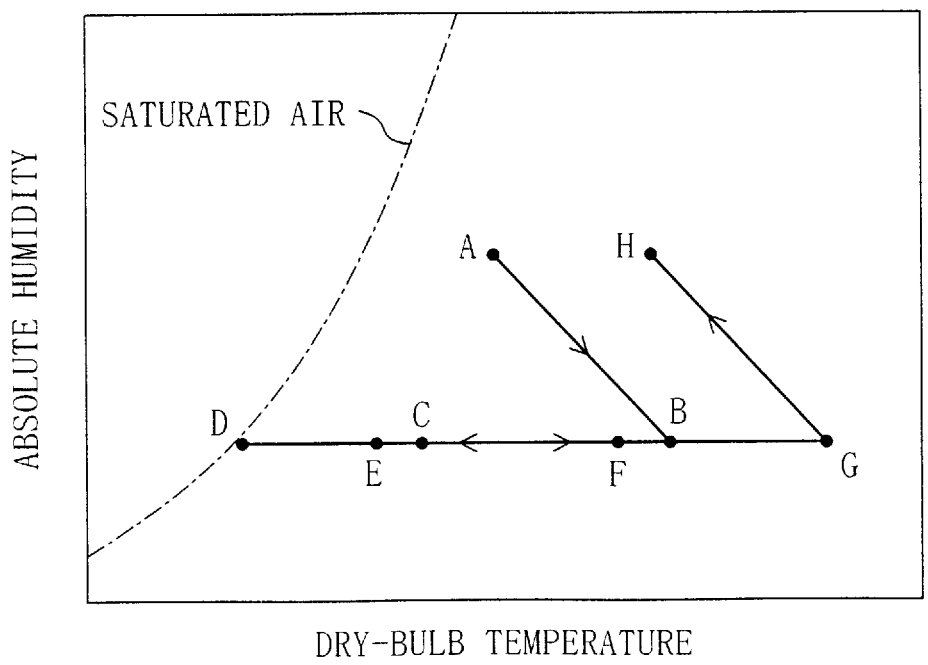
FIG. 2 is a psychrometric chart showing behavior of the air conditioning system according to Embodiment 1.

At this point, the temperature of the heat-absorbing air in the state of point I is equal to that of the heat-absorbing air at the outlet of the heat exchanger (30) in Embodiment 1 (the point E in FIG. 2). In this embodiment, however, not only the heat-absorbing air but also the moisture supplied by the water introducing section (42) absorb heat from the room air. That is, cooling the room air is carried out by not only sensible heat change in the heat-absorbing air but also latent heat change in the moisture. Therefore, in this embodiment, the amount of heat absorbed from the room air, i.e., the cooling capacity, can be increased as compared with Embodiment 1.

The heat-absorbing air in the state of point I flows into the second passage (17) of the internal heat exchanger (15). Like Embodiment 1, in the internal heat exchanger (15), the heat-absorbing air in the first passage (16) exchanges heat with the heat-absorbing air in the second passage (17). Thereby, the heat-absorbing air in the state of point I is heated in the course of flowing through the second passage (17) to come to a state of point J.

The heat-absorbing air in the state of point J is supplied to the compressor (21). In the compressor (21), the heat-absorbing air in the state of point J is compressed and thereby increases its temperature and pressure with its absolute humidity kept constant to come to a state of point K.

The heat-absorbing air in the state of point K passes through the outlet duct (24) and then flows into the moisture releasing section (63) of the dehumidifying mechanism (60). In the moisture releasing section (63), the heat-absorbing air contacts the rotor member (61) so that the rotor member (61) releases moisture to the heat-absorbing air. The heat-absorbing air in the state of point K thereby increases its absolute humidity and reduces its temperature with an isenthalpic change so that it changes from the state of point K to a state of point L. The heat-absorbing air in the state of point L passes through the outlet duct (24) again and is then discharged to outdoors.

In the dehumidifying mechanism (60), the rotor member (61) is driven into rotation. This rotor member (61) thereby moves between the moisture absorbing section (62) and the moisture releasing section (63) to repeat moisture absorption in the moisture absorbing section (62) and moisture release in the moisture releasing section (63). This provides continuous dehumidification of the heat-absorbing air.

Effects of Embodiment 2

According to Embodiment 2, the following effects can be obtained in addition to the effects of Embodiment 1.

The heat exchanger (30) is provided with the water introducing section (42) through which moisture is supplied to the heat-absorbing air which is absorbing heat from the subject to be cooled. Therefore, latent heat of evaporation of the moisture supplied by the water introducing section (42) can be used to cool the room air. As a result, the cooling capacity can be increased merely by moisture supply from the water introducing section (42) without increasing the input to the motor (35). The increase in cooling capacity provides enhanced COP.

Modified Example 1 of Embodiment 2

In Embodiment 2 described above, the heat exchanger (30) is provided with the water introducing section (42) so that moisture is supplied from the water pipe (50) to the heat-absorbing air in the heat absorption side passage (32). A drain produced by cooling the room air in the heat exchanger (30) may be used instead to supply it to the heat-absorbing air in the heat absorption side passage (32).

Specifically, the heat exchanger (30) is provided with a moisture permeable membrane as a partition capable of permeating moisture. This moisture permeable membrane is similar to the permeable membrane for the water introducing section (42). The moisture permeable membrane defines the heat absorption side passage (32) so that the room air as an air to be cooled exchanges heat with the heat-absorbing air in the heat absorption side passage (32) with the moisture permeable membrane interposed therebetween.

In this case, moisture in the room air is cooled to condense and produce a drain. The drain permeates the moisture permeable membrane because of a pressure difference developed across the moisture permeable membrane and is thereby supplied to the heat-absorbing air in the heat absorption side passage (32). Specifically, the room air has an atmospheric pressure, whereas the heat-absorbing air in the heat absorption side passage (32) is reduced in pressure through the expansion in the expander (22). Therefore, a pressure difference is developed across the moisture permeable membrane, and the drain permeates the moisture permeable membrane with the help of the pressure difference as a driving force.

The drain supplied to the heat-absorbing air in the heat absorption side passage (32) absorbs heat from the room air to evaporate. Latent heat of evaporation of the drain is used to cool the room air. Therefore, there is no need for the drainage process of disposing of the drain produced by cooling the room air. This eliminates the construction required for the drainage process thereby providing simplified construction.

Modified Example 2 of Embodiment 2

Figure 5:
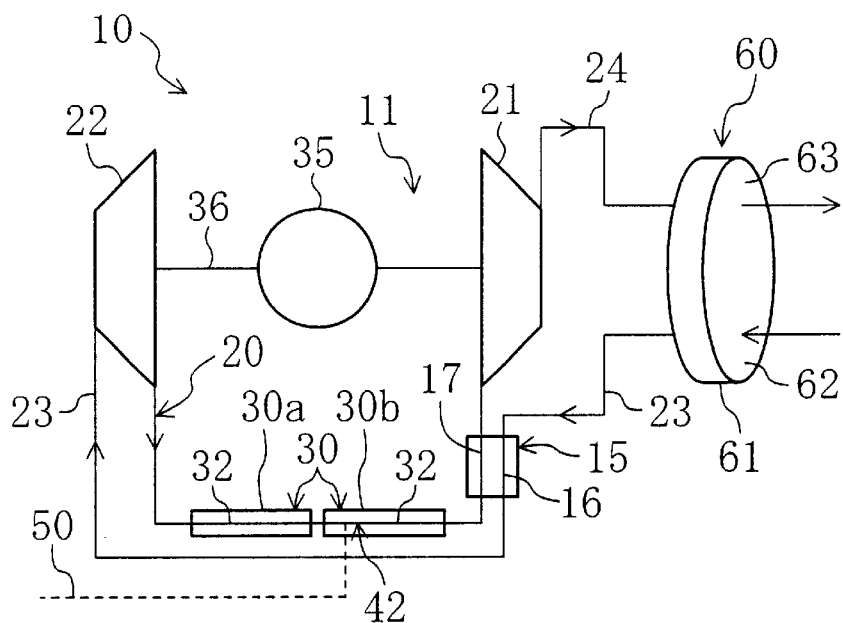
FIG. 5 is a schematic constructional diagram showing the construction of an air conditioning system according to a modified example of Embodiment 2.

In Embodiment 1 described above, an integral heat exchanger (30) is provided with the water introducing section (42). Alternatively, as shown in FIG. 5, the heat exchanger (30) may be composed of two sections, i.e., a first heat exchange section (30a) and a second heat exchange section (30b), and the water introducing section (42) may only be provided in the second heat exchange section (30b).

The first heat exchange section (30a) and the second heat exchange section (30b) are of the same construction as the heat exchanger (30) in Embodiment 2. Specifically, each of the heat exchange sections (30a, 30b) has a heat absorption side passage (32) defined by a partition, and is arranged to provide heat exchange between the heat-absorbing air in the heat absorption side passage (32) and the room air as an air to be cooled. Each of the heat exchange sections (30a, 30b) is disposed between the expander (22) and the compressor (21) in the cyclic circuit (20). The first heat exchange section (30a) is disposed on the side close to the expander (22), while the second heat exchange section (30b) is disposed on the side close to the compressor (21).

The second heat exchanger section (30b) is provided with a water introducing section (42). The water introducing section (42) has the same construction as in Embodiment 2 so that moisture is supplied to the heat-absorbing air in the heat absorption side passage (32) at the side of the second heat exchange section (30b).

In the first heat exchange section (30a), the heat-absorbing air in the heat absorption side passage (32) absorbs heat from the room air. On the other hand, in the second heat exchange section (30b), both the heat-absorbing air in the heat absorption side passage (32) and moisture supplied by the water introducing section (42) absorb heat from the room air so that the moisture evaporates.

Embodiment 3 of the Invention

In Embodiment 3 of the present invention, a humidifier/cooler (90) as a humidifying/cooling means and a heating heat exchanger (101) as a heating means are provided in addition to the construction of Embodiment 2 described above. Below, different structures than in Embodiment 2 will be described.

Figure 6:
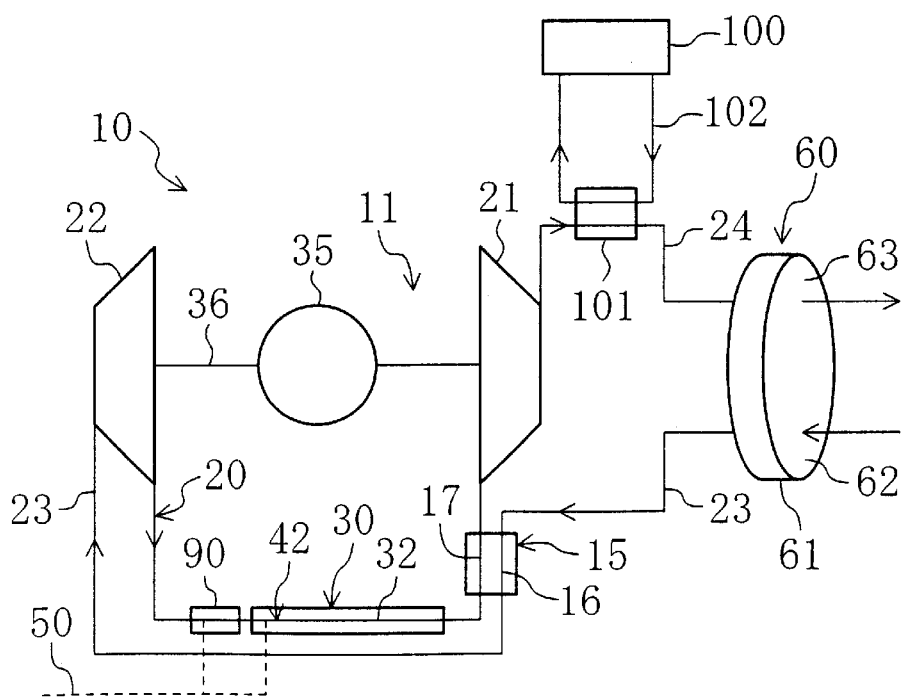
FIG. 6 is a schematic constructional diagram showing the construction of an air conditioning system according to Embodiment 3.

As shown in FIG. 6, the humidifier/cooler (90) is disposed between the expander (22) and the heat exchanger (30) in the cyclic circuit (20). The humidifier/cooler (90) is provided with a permeable membrane capable of permeating moisture, and divided into air side and water side spaces by the permeable membrane. The air side space is connected at one end thereof to the expander (22) and connected at the other end to heat absorption side passage (32) of the heat exchanger (30) 5o that the heat-absorbing air flows therethrough. The water side space is communicated with a water pipe (50) so that city water or the like is supplied thereto. The humidifier/cooler (90) is arranged so that moisture in the water side space is supplied to the heat-absorbing air in the air side space by the permeation through the permeable membrane and the supplied moisture is evaporated in the heat-absorbing air to cool the heat-absorbing air.

The heating heat exchanger (101) is disposed upstream of the moisture releasing section (63) in the outlet duct (24). The heating heat exchanger (101) is communicated with cooling water piping (102). The cooling water piping (102) is connected at both ends thereof to a fuel cell (100) as a waste heat source and channels a cooling water therethrough. The heating heat exchanger (101) is arranged to provide heat exchange between the heat-absorbing air in the outlet duct (24) and the cooling water in the cooling water piping (102) to supply waste heat emitted from the fuel cell (100) to the heat-absorbing air. The heat-absorbing air heated in the heating heat exchanger (101) flows into the moisture releasing section (63) of the dehumidifying mechanism (60) so that the waste heat from the fuel cell (100) is used to regenerate the solid adsorbent.

Behavior in Operation

Figure 7:
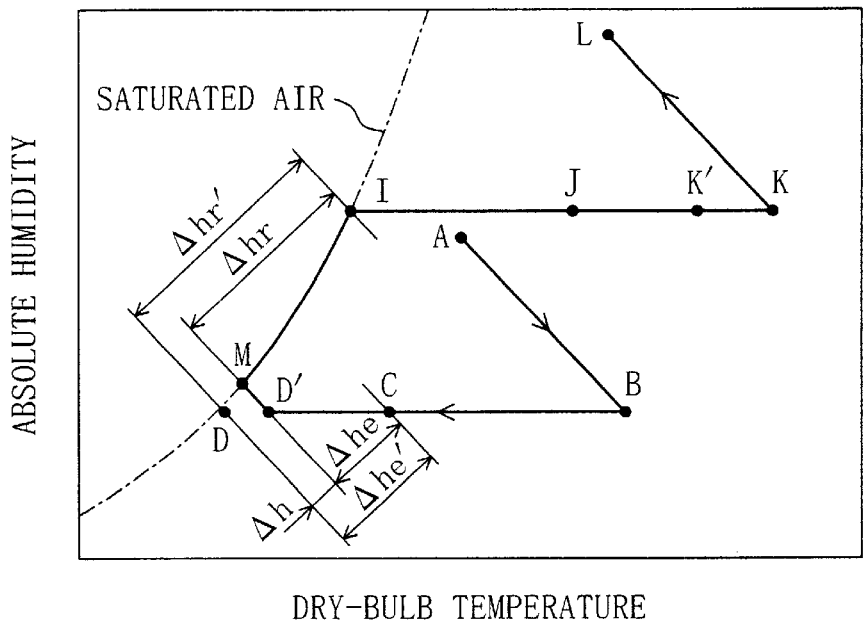
FIG. 7 is a psychrometric chart showing behavior of the air conditioning system according to Embodiment 3.

Next, behavior of the air conditioning system (10) in operation will be described with reference to the psychrometric chart of FIG. 7. It is to be noted that in FIG. 7, the same reference characters as designated in FIG. 4 represent the same states.

In the cyclic circuit (20), an outside air in a state of point A is taken as a heat-absorbing air through the inlet duct (23). This heat-absorbing air comes to a state of point C via a state of point B, like Embodiment 1. That is, the heat-absorbing air in the state of point A is dehumidified in the dehumidifying mechanism (60) to come to the state of point B and cooled in the internal exchanger (15) to come to the state of point C.

The heat-absorbing air in the state of point C is supplied to the expander (22) and expands therein. In this case, the expansion ratio at the expander (22) in this embodiment is set at a smaller value than that in Embodiment 2. Therefore, the heat-absorbing air in the state of point C expands in the expander (22) to come to a state of point D' of higher temperature than a state of point D.

The heat-absorbing air in the state of point D' flows into the dehumidifier/cooler (90). In the dehumidifier/cooler (90), moisture is supplied to the heat-absorbing air and evaporates therein. In the dehumidifier/cooler (90), the heat-absorbing air thereby increases its absolute humidity and reduces its temperature to come to a state of point M. In the state of point M, the heat-absorbing air exists as a saturated air.

The heat-absorbing air in the state of point M flows into the heat absorption side passage (32) of the heat exchanger (30), and exchanges heat with the room air in the course of flowing through the heat absorption side passage (32).

Further, the heat-absorbing air in the heat absorption side passage (32) is supplied with moisture from the water introducing section (42), and this moisture evaporates in the heat-absorbing air. Thereby, the heat-absorbing air in the state of point M and the moisture supplied to the heat-absorbing air absorb heat from the room air so that the room air is cooled. This cooling of the room air provides cooling for the room. In the meantime, the heat-absorbing air in the state of point M increases its absolute humidity and temperature while maintaining the condition of a saturated air, by undergoing the heat absorption and moisture evaporation, so that it reaches a state of point I.

The heat-absorbing air in the state of point I is heated in the internal heat exchanger (15) to come to a state of point J, like Embodiment 1.

The heat-absorbing air in the state of point J is supplied to the compressor (21) and compressed therein. In this case, the compression ratio at the compressor (21) in this embodiment is set at a smaller value than that in Embodiment 2 correspondingly to the above-described expansion ratio at the expander (22). Therefore, the heat-absorbing air in the state of point J reaches a state of point K' of lower temperature than a state of point K through the compression in the compressor (21).

The heat-absorbing air in the state of point K' passes through the outlet duct (24) and then flows into the heating heat exchanger (101). In the heating heat exchanger (101), the heat-absorbing air exchanges heat with the cooling water from the fuel cell (100) and is thereby heated to come to the state of point K.

The heat-absorbing air in the state of point K passes through the outlet duct (24) and then flows into the moisture releasing section (63) of the dehumidifying mechanism (60). In the moisture releasing section (63), the rotor member (61) is regenerated in the same manner as in Embodiment 1. The heat-absorbing air in the state of point K thereby increases its absolute humidity and reduces its temperature with an isenthalpic change so that it changes from the state of point K to a state of point L. The heat-absorbing air in the state of point L passes through the outlet duct (24) again and is then discharged to outdoors.

Effects of Embodiment 3

According to Embodiment 3, the effects of Embodiment 2 can naturally be obtained, and additionally the COP can be enhanced because of provision of the humidifier/cooler (90) and the heating heat exchanger (101). In this respect, description will be made below with reference to the psychrometric chart of FIG. 7.

In Embodiment 2, the difference in specific enthalpy between both the heat-absorbing airs at the inlet (point C) and the outlet (point D) of the expander (22) is $\Delta he'$. The difference in specific enthalpy between both the heat-absorbing airs at the inlet (point D) and the outlet (point I) of the heat exchanger (30) is $\Delta hr'$.

On the other hand, in Embodiment 3, the humidifier/cooler (90) is provided and the expansion ratio at the expander (22) is set at a smaller value than that in Embodiment 2. Therefore, the difference in specific enthalpy between both the heat-absorbing airs at the inlet (point C) and the outlet (point D') of the expander (22) is $\Delta he$. The difference in specific enthalpy between both the heat-absorbing airs at the inlet (point M) and the outlet (point I) of the heat exchanger (30) is $\Delta hr$. In other words, in this embodiment, the above respective specific enthalpy differences for the heat-absorbing airs are each reduced by $\Delta h$ as compared with Embodiment 2.

Meanwhile, the specific enthalpy difference between the heat-absorbing airs at the inlet and outlet of the expander

(22) is in direct proportion to the input to the motor (35). Therefore, the ratio of the specific enthalpy difference between the heat-absorbing airs at the inlet and outlet of the heat exchanger (30) with the specific enthalpy difference between the heat-absorbing airs at the inlet and outlet of the expander (22) is directly proportional to the COP. In this context, a comparison of Embodiment 3 with Embodiment 2 shows that the relationship of Δhr'>Δhe' is established between the specific enthalpy differences Δhr' and Δhe' This leads to the following relationship:

$$(\Delta hr/\Delta he)=(\Delta hr'-\Delta h)/(\Delta he'-\Delta h)>(\Delta hr'/\Delta he')$$

Therefore, according to Embodiment 3, the ratio of the specific enthalpy difference between the heat-absorbing airs at the inlet and outlet of the heat exchanger (30) with the specific enthalpy difference between the heat-absorbing airs at the inlet and outlet of the expander (22) can be increased as compared with Embodiment 2, which provides enhanced COP.

In this embodiment, the temperature of the heat-absorbing air is reduced at the outlet of the compressor (21) because the expansion ratio at the expander (22) is set at a smaller value. In this embodiment, however, the heating heat exchanger (101) is provided and the heat-absorbing air is heated by waste heat of the fuel cell (100). Therefore, in flowing into the moisture releasing section (63) of the dehumidifying mechanism (60), the heat-absorbing air can be kept at a temperature (point K) equal to that in Embodiment 2. Accordingly, regeneration of the rotor member (61) can be implemented in the same conditions as in Embodiment 2.

Modified Example of Embodiment 3

Figure 8:
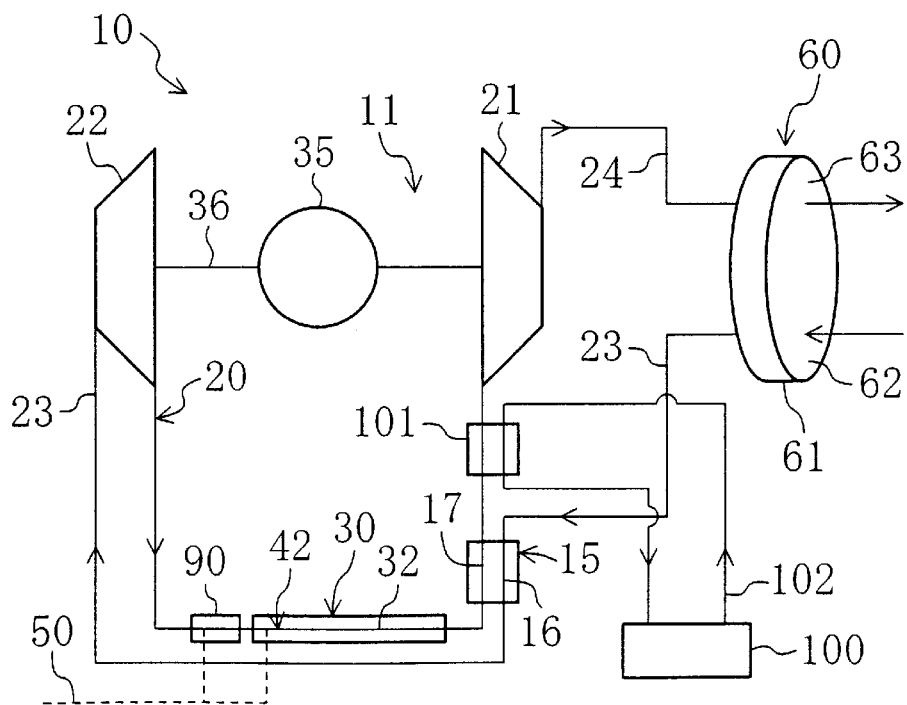
FIG. 8 is a schematic constructional diagram showing the construction of an air conditioning system according to a modified example of Embodiment 3.

In Embodiment 3, the heating heat exchanger (101) is provided in the outlet duct (24). Alternatively, as shown in FIG. 8, the heating heat exchanger (101) may be disposed between the internal heat exchanger (15) and the compressor (21) in the cyclic circuit (20).

In this modified example, the heat-absorbing air is heated while flowing through the second passage (17) of the internal heat exchanger (15), further heated in the heating heat exchanger (101), and then compressed in the compressor (21). Then, the heat-absorbing air compressed in the compressor (21) flows into the moisture releasing section (63) of the dehumidifying mechanism (60) so that the rotor member (61) is regenerated.

In this modified example, the heat-absorbing air in a portion of the cyclic circuit (20) upstream of the compressor (21) is heated. Specifically, in the heating heat exchanger (101), the heat-absorbing air prior to being compressed exchanges heat with the cooling water from the fuel cell (100). In this case, the heat-absorbing air prior to being compressed has a lower temperature than the heat-absorbing air after having been compressed. Therefore, in this embodiment, the temperature differential between fluids which provide heat exchange in the heating heat exchanger (101) can be increased. Accordingly, waste heat from the fuel cell (100) can be utilized further effectively.

Embodiment 4 of the Invention

Figure 9:
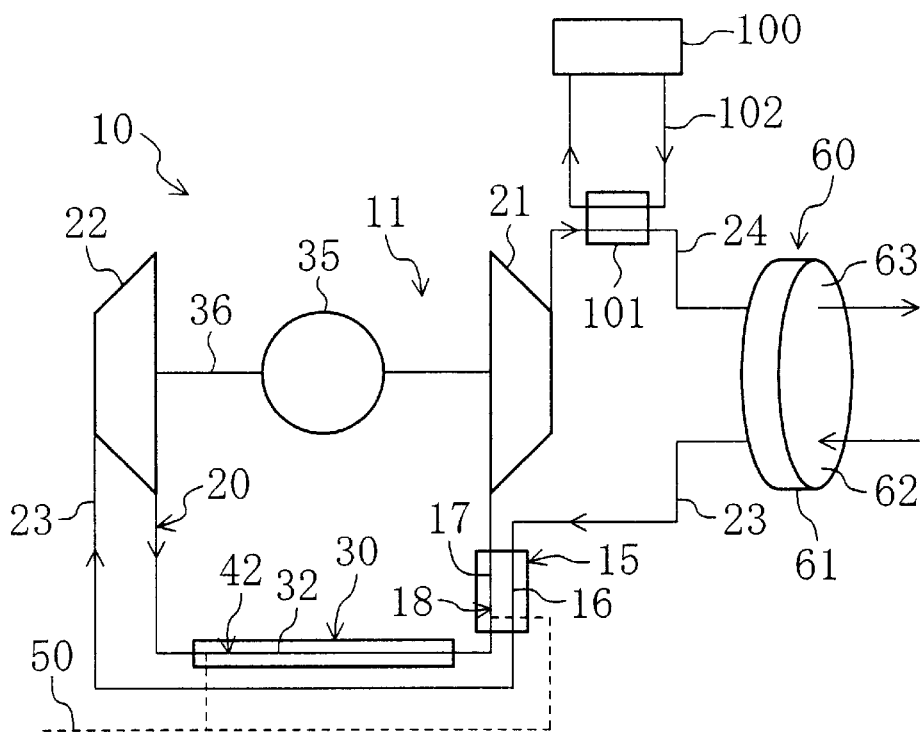
FIG. 9 is a schematic constructional diagram showing the construction of an air conditioning system according to Embodiment 4.

In Embodiment 4 of the present invention, as shown in FIG. 9, a water introducing section (18) is provided in the internal heat exchanger (15) instead of the humidifier/cooler (90) in Embodiment 3 (see FIG. 6). This water introducing section (18) is arranged substantially similarly to the water introducing section (42) provided in the heat exchanger (30).

Specifically, the water introducing section (18) is provided with a permeable membrane capable of permeating moisture, wherein a water side space is formed on one side of the permeable membrane and the side of the permeable membrane opposite to the water side space constitutes the second passage (17) of the internal heat exchanger (15). The water side space is communicated with a water pipe (50) so that city water or the like is supplied thereto. In the water introducing section (18), moisture in the water side space is supplied to the heat-absorbing air in the second passage (17) by the permeation through the permeable membrane. Further, moisture is evaporated by the heat-absorbing air in the second passage (17), and latent heat of evaporation of the moisture is used to cool the heat-absorbing air in the first passage (16).

Behavior in Operation

Figure 10:
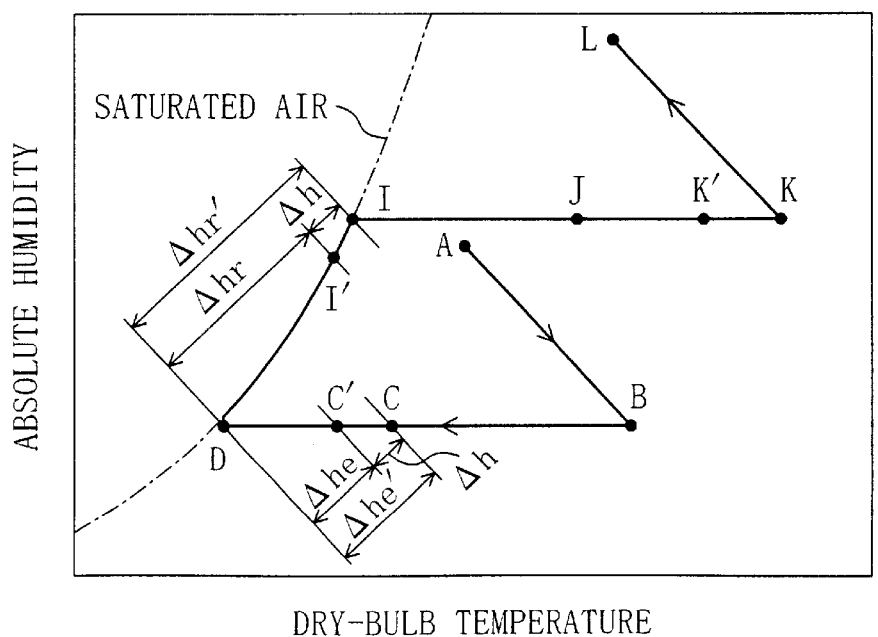
FIG. 10 is a psychrometric chart showing behavior of the air conditioning system according to Embodiment 4.

Next, behavior of the air conditioning system (10) in operation will be described with reference to the psychrometric chart of FIG. 10. It is to be noted that in FIG. 10, the same reference characters as designated in FIG. 7 represent the same states.

In the cyclic circuit (20), an outside air in a state of point A is taken as a heat-absorbing air through the inlet duct (23). This heat-absorbing air is dehumidified in the dehumidifying mechanism (60) to comes to a state of point B, like Embodiment 1.

The heat-absorbing air in the state of point B flows into the first passage (16) of the internal exchanger (15) and exchanges heat with the heat-absorbing air in the second passage (17). In the meantime, the heat-absorbing air in the second passage (17) is supplied with moisture from the water introducing section (18), and the moisture absorbs heat from the heat-absorbing air in the first passage (16) to evaporate. The heat-absorbing air in the state of point B is cooled in the course of flowing through the first passage (16) to comes to a state of point C' of lower temperature than a state of point C.

The heat-absorbing air in the state of point C' flows into the expander (22), and expands therein to reduce its temperature and pressure with its absolute humidity kept constant, so that it comes to a state of point D. Meanwhile, in the internal heat exchanger (15) in this embodiment, the heat-absorbing air is cooled to the state of point C' of lower temperature than the state of point C. Accordingly, in this embodiment, the expansion ratio at the expander (22) can be set at a lower value than in Embodiment 2.

The heat-absorbing air in the state of point D flows into the heat absorption side passage (32) of the heat exchanger (30), and exchanges heat with the room air in the course of flowing through the heat absorption side passage (32). Further, the heat-absorbing air in the heat absorption side passage (32) is supplied with moisture from the water introducing section (42), and the moisture evaporates in the heat-absorbing air. Thereby, the heat-absorbing air in the state of point D and the moisture supplied to the heat-absorbing air absorb heat from the room air so that the room air is cooled. This cooling of the room air provides cooling for the room. In the meantime, the heat-absorbing air in the state of point D becomes a saturated air through the heat absorption and moisture evaporation, and then increases its absolute humidity and temperature while maintaining the condition of a saturated air to reach a state of point I' of lower absolute humidity and temperature than the state of point I.

The heat-absorbing air in the state of point I' flows into the second passage (17) of the internal heat exchanger (15). The heat-absorbing air in the second passage (17) is supplied with moisture from the water introducing section (18). In the second passage (17), the heat-absorbing air and the moisture supplied thereto absorb heat from the heat-absorbing air in the first passage (16), and through the heat absorption and moisture evaporation, the heat-absorbing air comes from the state of point I' to a state of point J through a state of point I.

The heat-absorbing air in the state of point J reaches a state of point L via states of points K' and K, like Embodiment 3. Specifically, the heat-absorbing air in the state of point J is compressed in the compressor (21) to come to the state of point K', is heated in the heating heat exchanger (101) to come to the state of point K, and then undergoes moisture release in the moisture releasing section (63) of the dehumidifying mechanism (60) through the rotor member (61) to come to the state of point L. The heat-absorbing air in the state of point L passes through the outlet duct (24) and is then discharged to outdoors.

Effects of Embodiment 4

According to Embodiment 4, the same effects as in Embodiment 3 can be obtained. That is, the COP can be enhanced because of provision of the water introducing section (18) in the internal heat exchanger (15). In this respect, description will be made below with reference to the psychrometric chart of FIG. 10.

In Embodiment 2, the difference in specific enthalpy between the heat-absorbing airs at the inlet (point C) and the outlet (point D) of the expander (22) is $\Delta he'$. The difference in specific enthalpy between the heat-absorbing airs at the inlet (point D) and the outlet (point I) of the heat exchanger (30) is $\Delta hr'$.

On the other hand, in Embodiment 4, the water introducing section (18) is provided in the internal heat exchanger (15), and both the amount of humidification in the water introducing section (42) of the heat exchanger (30) and the expansion ratio at the expander (22) are set at smaller values than those in Embodiment 2. Therefore, the difference in specific enthalpy between the heat-absorbing airs at the inlet (point C') and the outlet (point D) of the expander (22) is $\Delta he$. Further, the difference in specific enthalpy between the heat-absorbing airs at the inlet (point D) and the outlet (point I') of the heat exchanger (30) is $\Delta hr$. Furthermore, in the internal heat exchanger (15), the heat-absorbing air in the second passage (17) changes from point I' to point I by moisture evaporation, while the heat-absorbing air in the second passage (16) is cooled to point C' of lower temperature than point C. Therefore, both the specific enthalpy difference between the heat-absorbing airs at points I and I' and the specific enthalpy difference between the heat-absorbing airs at points C and C' are $\Delta h$. In this embodiment, the above respective specific enthalpy differences for the heat-absorbing airs are each reduced by $\Delta h$ as compared with Embodiment 2.

As has already been described, the ratio of the specific enthalpy difference between the heat-absorbing airs at the inlet and outlet of the heat exchanger (30) with the specific enthalpy difference between the heat-absorbing airs at the inlet and outlet of the expander (22) is directly proportional to the COP. Accordingly, also in Embodiment 4, the following relationship holds like Embodiment 3:

$$(\Delta hr/\Delta he)=(\Delta hr'-\Delta h)/(\Delta he'-\Delta h)>(\Delta hr'/\Delta he')$$

Therefore, according to Embodiment 4, the ratio of the specific enthalpy difference between the heat-absorbing airs at the inlet and outlet of the heat exchanger (30) with the specific enthalpy difference between the heat-absorbing airs at the inlet and outlet of the expander (22) can be increased as compared with Embodiment 2, which provides enhanced COP.

Embodiment 5 of the Invention

In Embodiment 5 of the present invention, a feeder (99) as a water supply means is provided in addition to the construction of Embodiment 2 described above. Below, different structures than in Embodiment 2 will be described.

Figure 11:
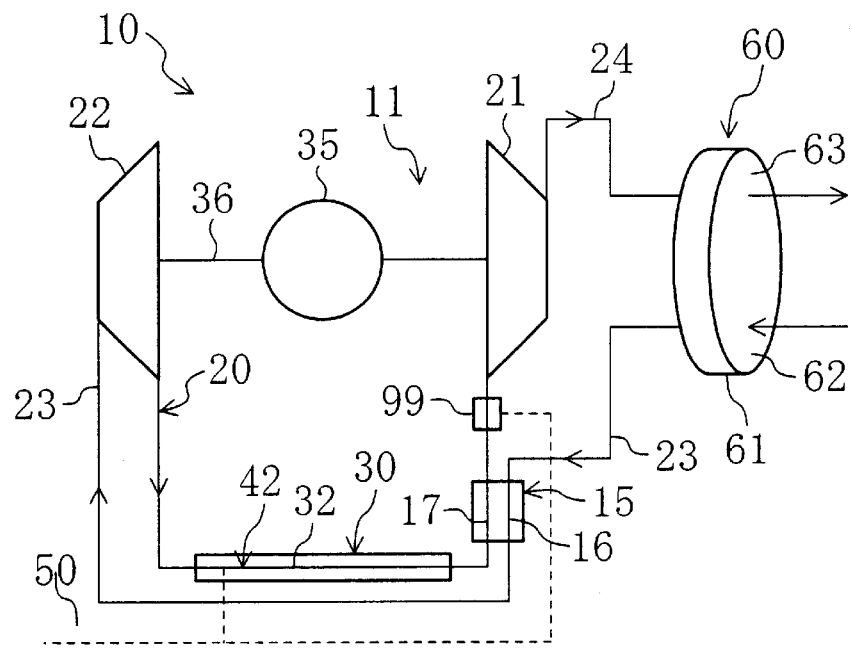
FIG. 11 is a schematic constructional diagram showing the construction of an air conditioning system according to Embodiment 5.

As shown in FIG. 11, the feeder (99) is disposed in a portion of the cyclic circuit (20) located between the internal heat exchanger (15) and the compressor (21) and immediately upstream of the compressor (21). The feeder (99) is arranged to supply moisture to the heat-absorbing air in reduced pressure condition in the cyclic circuit (20). The moisture supplied from the feeder (99) to the heat-absorbing air evaporates in the course of compression of the heat-absorbing air in the compressor (21).

Behavior of the air conditioning system (10) in operation according to this embodiment is substantially the same as in Embodiment 2, but only different in that moisture evaporates in the heat-absorbing air in the compressor (21).

Effects of Embodiment 5

In Embodiment 5, in the process of compression of the heat-absorbing air in the compressor (21), moisture is evaporated in the heat-absorbing air. Therefore, the enthalpy of the heat-absorbing air at the outlet of the compressor (21) can be reduced, and the enthalpy difference between the heat-absorbing airs at the inlet and outlet of the compressor (21) can be thereby reduced. Accordingly, required power for compression, i.e., the input to the motor (35), can be reduced, which provides further enhanced COP.

Embodiment 6 of the Invention

Embodiment 6 of the present invention is arranged as an air conditioning system (10) for cooling a room which requires cooling throughout the year, e.g., a room in which a mainframe computer is installed. Correspondingly, the air conditioning system (10) is arranged to be operable in both the mode of effecting the air cycle operation to cool the room air and the mode of stopping the air cycle operation and using the taken outside air to cool the room air.

Figure 12:
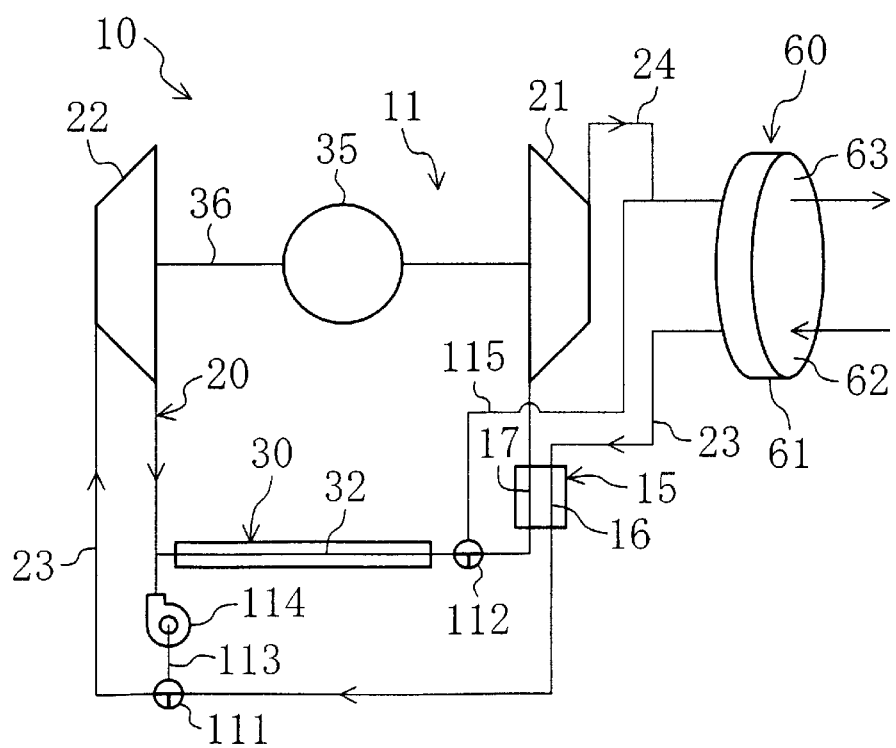
FIG. 12 is a schematic constructional diagram showing the construction of an air conditioning system according to Embodiment 6.
Figure 13:
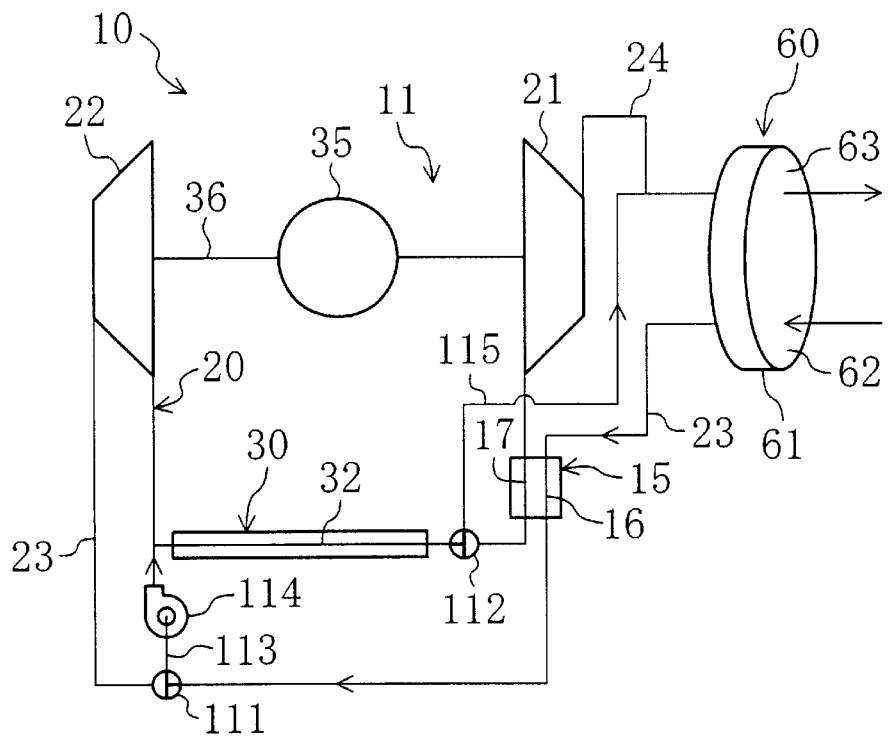
FIG. 13 is a schematic constructional diagram showing the construction of the air conditioning system according to Embodiment 6.

As shown in FIGS. 12 and 13, the air conditioning system (10) is constructed by adding selector valves (111, 112) to the construction of Embodiment 1. Below, different structures than in Embodiment 1 will be described.

A first selector valve (111) is provided between the internal heat exchanger (15) and the expander (22) in the inlet duct (23). The first selector valve (111) is connected to one end of a first bypass duct (113). The other end of the first bypass duct (113) is connected to a portion of the cyclic circuit (20) located between the expander (22) and the heat exchanger (30). The first bypass duct (113) is provided with a bypassing fan (114). The bypassing fan (114) is arranged to allow air flow from one end to the other of the first bypass duct (113).

The first selector valve (111) is arranged to select between a position to communicate the internal heat exchanger (15) side with the expander (22) side of the inlet duct (23) and block communication between the first bypass duct (113) and the inlet duct (23) (see FIG. 12) and another position to block communication between the internal heat exchanger (15) side and the expander (22) side of the inlet duct (23) and communicate the internal heat exchanger (15) side of the inlet duct (23) with the first bypass duct (113) (see FIG. 13).

A second selector valve (112) is provided between the heat exchanger (30) and the internal heat exchanger (30) in the cyclic circuit (20). The second selector valve (112) is connected to one end of a second bypass duct (115). The other end of the second bypass duct (115) is connected to a portion of the outlet duct (24) located between the compressor (21) and the moisture releasing section (63).

The second selector valve (112) is arranged to select between a position to communicate the heat absorption side passage (32) of the heat exchanger (30) with the second passage (17) of the internal heat exchanger (15) and block communication of both the heat absorption side passage (32) and the second passage (17) with the second bypass duct (115) (see FIG. 12) and another position to block communication between the heat absorption side passage (32) of the heat exchanger (30) and the second passage (17) of the internal heat exchanger (15) and communicate the heat absorption side passage (32) with the second bypass duct (115) (see FIG. 13).

Behavior in Operation

Next, behavior of the air conditioning system (10) in operation will be described.

When the outside air temperature is higher than the room temperature, for example, in summer, the first selector valve (111) and the second selector valve (112) are selected in the position as shown in FIG. 12. In this position, the heat-absorbing air flows through the air cycle part (11) in the same manner as in Embodiment 1 so that the air cycle operation is effected. In the heat exchanger (30), the heat-absorbing air having been reduced in pressure to reach a low temperature exchanges heat with the room air so that the room air is cooled for cooling the room.

On the other hand, when the outside air temperature is lower than the room temperature, for example, in winter, the first selector valve (111) and the second selector valve (112) are selected in the position as shown in FIG. 13. In this position, the heat-absorbing air flows through the air cycle part (11) in a manner to bypass the expander (22), the internal heat exchanger (15) and the compressor (21). Therefore, in the air cycle part (11), the air cycle operation is stopped and the outside air taken therein through the inlet duct (23) is supplied to the heat absorption side passage (32) of the heat exchanger (30) as it is.

Specifically, the outside air taken in as a heat-absorbing air through the inlet duct (23) passes through the first bypass duct (113) and then flows into the heat absorption side passage (32). In the heat absorption side passage (32), the heat-absorbing air which is an outside air exchanges heat with the room air so that the room air is cooled. Thereafter, the heat-absorbing air flows through the 25 second bypass duct (115), passes through the outlet duct (24) and is then discharged to outdoors.

Effects of Embodiment 6

According to Embodiment 6, when the outside air temperature is low such as in winter, the outside air can be introduced, as it is, into the heat absorption side passage (32) of the heat exchanger (30) through the selection of the selector valves (111, 112). Therefore, unnecessary air cycle operations can be avoided, and the room can be cooled with lesser energy. Accordingly, required energy for cooling through the year can be reduced, which provides reduction in cost required for cooling.

Other Embodiments of the Invention

First Modification

In each of the above embodiments, the dehumidifying mechanism (60) is formed by using the solid adsorbent. The dehumidifying mechanism (60) may be formed by using a liquid absorbent instead. Hereinafter, the dehumidifying mechanism (60) using the liquid absorbent will be described by taking the case of applying it to Embodiment 1 as an example.

Figure 14:
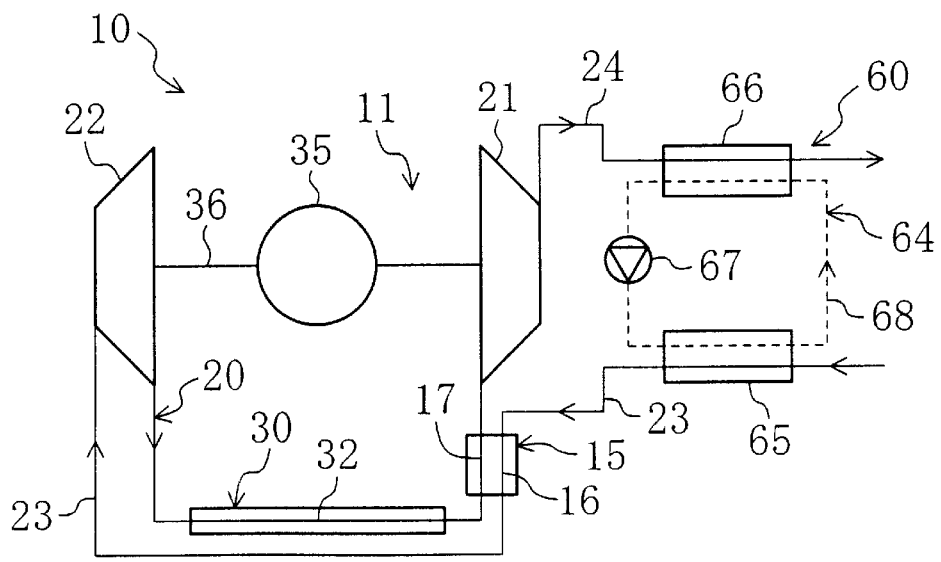
FIG. 14 is a schematic constructional diagram showing the construction of an air conditioning system according to another embodiment.

As shown in FIG. 14, the dehumidifying mechanism (60) of this modification consists of a circulation circuit (64) formed by sequentially connecting a moisture absorbing section (65), a moisture releasing section (66) and a pump (67) through liquid piping (68). The circulation circuit (64) is filled with a water solution of metallic halide as a liquid absorbent. Examples of metallic halide of this kind include LiCl, LiBr and $CaCl_2$. The liquid absorbent may be a water solution of hydrophilic organic compound. Examples of organic compound of this kind include ethylene glycol, glycerin and hydrophilic resin.

The moisture absorbing section (65) is placed partway in the inlet duct (23). The moisture absorbing section (65) is provided with a hydrophobic porous membrane capable of permeating moisture, and divided into air side and liquid side spaces by the hydrophobic porous membrane. The air side space is communicated with the inlet duct (23) so that the heat-absorbing air flows therethrough. The liquid side space is communicated with the liquid piping (68) so that the liquid absorbent flows therethrough. In the moisture absorbing section (65), the heat-absorbing air in the air side space indirectly contacts the liquid absorbent in the liquid side space through the hydrophobic porous membrane so that moisture contained in the heat-absorbing air is absorbed in the liquid absorbent after the permeation through the hydrophobic porous membrane. In this manner, the moisture absorbing section (65) effects dehumidification of the heat-absorbing air.

The moisture releasing section (66) is arranged in the same manner as in the moisture absorbing section (65) and placed partway in the outlet duct (24). The moisture releasing section (66) is provided with a hydrophobic porous membrane, and divided into air side and liquid side spaces. The air side space is communicated with the outlet duct (24) so that the heat-absorbing air flows therethrough. The liquid side space is communicated with the liquid piping (68) so that the liquid absorbent flows therethrough. In the moisture releasing section (66), the heat-absorbing air in the air side space indirectly contacts the liquid absorbent in the liquid side space through the hydrophobic porous membrane so that the liquid absorbent is heated through its heat exchange with the heat-absorbing air. This heating desorbs moisture from the liquid absorbent and the desorbed moisture moves to the heat-absorbing air. That is, the moisture releasing section (66) provides regeneration of the liquid absorbent.

In the circulation circuit (64), the liquid absorbent circulates by means of the pump (67) so that dehumidification of the heat-absorbing air is continuously made. Specifically, the liquid absorbent absorbs moisture of the heat-absorbing air in the moisture absorbing section (65), and flows through the liquid piping (68) into the moisture releasing section (66). In the moisture releasing section (66), the liquid absorbent is heated and releases moisture to the heat-absorbing air. The liquid absorbent is thereby regenerated. The regenerated liquid absorbent flows through the liquid piping (68) and enters the moisture absorbing section (65) again. The liquid absorbent repeats this circulation.

Second Modification

In each of the above embodiments, a cooling operation is effected by using a room air as a subject to be cooled and cooling the room air in the heat exchanger (30). Alternatively, a cooling operation may be effected by cooling a water in the heat exchanger (30) to produce a cool water and then cooling the room air with the cool water.

Further, in each of the above embodiments, air conditioning is made by using the room air as the subject to be cooled for the refrigerating system. Alternatively, a cooling water for cooling system components may be used as the subject to be cooled, and heat release from the components which must be cooled may be made with the cooling water cooled in the heat exchanger (30).

Industrial Applicability

As can be seen form the above, the refrigerating system according to the present invention is useful for cooling a room or system components, and particularly suitable for providing a cooling operation on an air cycle.

What is claimed is:

1. A refrigerating system for cooling a subject to be cooled, comprising:

an air cycle part (11) for taking in a heat-absorbing air, reducing the pressure of the heat-absorbing air and compressing the heat-absorbing air having absorbed heat from the subject to be cooled after the pressure reduction thereof; and Dehumidifying means (60) for dehumidifying the heat-absorbing air and then supplying the heat-absorbing air to the air cycle part (11), wherein the dehumidifying means (60) is arranged to include a humidity medium for effecting moisture absorption and release, dehumidify the heat-absorbing air through moisture absorption of the humidity medium and regenerate through moisture release of the humidity medium, and wherein the dehumidifying means (60) is arranged to release moisture to the heat-absorbing air compressed in the air cycle part (11).

2. A refrigerating system for cooling a subject to be cooled, comprising:

an air cycle part (11) including an expander (22) for taking in a heat-absorbing air and reducing the pressure of the heat-absorbing air, a heat absorbing section (30) in which the heat-absorbing air reduced in pressure in the expander (22) absorbs heat from the subject to be cooled, and a compressor (21) for compressing the heat-absorbing air having absorbed heat in the heat absorbing section (30); and dehumidifying means (60) for dehumidifying the heat-absorbing air and then supplying the heat-absorbing air to the expander (22) of the air cycle part (11), wherein the dehumidifying means (60) is arranged to include a humidity medium for effecting moisture absorption and release, dehumidify the heat-absorbing air through moisture absorption of the humidity medium and regenerate through moisture release of the humidity medium, and wherein the dehumidifying means (60) is arranged to release moisture to the heat-absorbing air compressed in the air cycle part (11).

3. The refrigerating system of claim 1 or 2, wherein the humidity medium of the dehumidifying means (60) comprises a solid adsorbent for adsorbing moisture.

4. The refrigerating system of claim 3, wherein the humidity medium of the dehumidifying means (60) is formed of a disc-shaped rotor m ember (61) which is formed to allow air passage in a direction of thickness thereof and brings the passing air into contact with the solid adsorbent, and the dehumidifying means (60) comprises a moisture absorbing section (62) in which the rotor member (61) absorbs moisture from the heat-absorbing air passing through the rotor member (61), a moisture releasing section (63) in which the rotor member (61) releases moisture to the heat-absorbing air passing through the rotor member (61), and a drive mechanism for rotatively driving the rotor member (61) to allow the rotor member (61) to move between the moisture absorbing section (62) and the moisture releasing section (63).

5. The refrigerating system of claim 1 or 2, wherein the humidity medium of the dehumidifying means (60) comprises a liquid absorbent for absorbing moisture.

6. The refrigerating system of claim 5, wherein the dehumidifying means (60) is arranged to heat the liquid absorbent with the heat-absorbing air compressed in the air cycle part (11) to release moisture from the liquid absorbent.

7. The refrigerating system of claim 5, wherein the dehumidifying means (60) comprises a circulation circuit (64) that includes a moisture absorbing section (65) in which the liquid absorbent contacts with the heat-absorbing air to absorb moisture therefrom and a moisture releasing section (66) in which the liquid absorbent contacts with the heat-absorbing air to release moisture thereto, the circulation circuit (64) circulating the liquid absorbent between the moisture absorbing section (65) and the moisture releasing section (66).

8. The refrigerating system for cooling a subject to be cooled, comprising:

an air cycle part (11) including an expander (22) for taking in a heat-absorbing air and reducing the pressure of the heat-absorbing air, a heat absorbing section (30) in which the heat-absorbing air reduced in pressure in the expander (22) absorbs heat from the subject to be cooled, and a compressor (21) for compressing the heat-absorbing air having absorbed heat in the heat absorbing section (30); and dehumidifying means (60) for dehumidifying the heat-absorbing air and then supplying the heat-absorbing air to the expander (22) of the air cycle part (11), wherein the air cycle part (11) is arranged to provide heat absorption from an air to be cooled as the subject to be cooled in the heat absorbing section (30), and the heat absorbing section (30) is arranged to separate the air to be cooled from the heat-absorbing air by a moisture-permeable membrane, supply moisture having condensed in the air to be cooled to the heat-absorbing air based on a pressure difference developed across the partition and use latent heat of evaporation of the moisture for heat absorption from the air to be cooled.

9. The refrigerating system for cooling a subject to be cooled, comprising:

an air cycle part (11) for taking in a heat-absorbing air, reducing the pressure of the heat-absorbing air and compressing the heat-absorbing air having absorbed heat from the subject to be cooled after the pressure reduction thereof; and dehumidifying means (60) for dehumidifying the heat-absorbing air and then supplying the heat-absorbing air to the air cycle part (11), wherein the air cycle part (11) is arranged to operate in a mode of effecting an air cycle operation so that the heat-absorbing air in reduced pressure condition absorbs heat from the subject to be cooled and another mode in which the air cycle operation is stopped and the taken heat-absorbing air in normal pressure condition absorbs heat from the subject to be cooled.

10. A refrigerating system for cooling a subject to be cooled, comprising:

an air cycle part (11) for taking in a heat-absorbing air, reducing the pressure of the heat-absorbing air and compressing the heat-absorbing air having absorbed heat from the subject to be cooled after the pressure reduction thereof;

dehumidifying means (60) for dehumidifying the heat-absorbing air and then supplying the heat-absorbing air to the air cycle part (11), wherein the dehumidifying means (60) is arranged to include a humidity medium for effecting moisture absorption and release, dehumidify the heat-absorbing air through moisture absorption of the humidity medium and regenerate through moisture release of the humidity medium, and heating means (101) for heating the heat-absorbing air compressed in the air cycle part (11) and supplying the heat-absorbing air to the dehumidifying means (60).

11. A refrigerating system for cooling a subject to be cooled, comprising:

an air cycle part (11) for taking in a heat-absorbing air, reducing the pressure of the heat-absorbing air and compressing the heat-absorbing air having absorbed heat from the subject to be cooled after the pressure reduction thereof;

dehumidifying means (60) for dehumidifying the heat-absorbing air and then supplying the heat-absorbing air to the air cycle part (11), wherein the dehumidifying means (60) is arranged to include a humidity medium for effecting moisture absorption and release, dehumidify the heat-absorbing air through moisture absorption of the humidity medium and regenerate through moisture release of the humidity medium, and heating means (101) for heating the heat-absorbing air immediately prior to being compressed in the air cycle part (11).

12. A refrigerating system for cooling a subject to be cooled, comprising:

an air cycle part (11) including an expander (22) for taking in a heat-absorbing air and reducing the pressure of the heat-absorbing air, a heat absorbing section (30) in which the heat-absorbing air reduced in pressure in the expander (22) absorbs heat from the subject to be cooled, and a compressor (21) for compressing the heat-absorbing air having absorbed heat in the heat absorbing section (30); and dehumidifying means (60) for dehumidifying the heat-absorbing air and then supplying the heat-absorbing air to the expander (22) of the air cycle part (11), wherein the air cycle part (11) is arranged to operate in a mode of effecting an air cycle operation so that the heat-absorbing air in reduced pressure condition absorbs heat from the subject to be cooled and another mode in which the air cycle operation is stopped and the taken heat-absorbing air in normal pressure condition absorbs heat from the subject to be cooled.

13. A refrigerating system for cooling a subject to be cooled, comprising:

an air cycle part (11) including an expander (22) for taking in a heat-absorbing air and reducing the pressure of the heat-absorbing air, a heat absorbing section (30) in which the heat-absorbing air reduced in pressure in the expander (22) absorbs heat from the subject to be cooled, and a compressor (21) for compressing the heat-absorbing air having absorbed heat in the heat absorbing section (30);

dehumidifying means (60) for dehumidifying the heat-absorbing air and then supplying the heat-absorbing air to the expander (22) of the air cycle part (11); and heating means (101) for heating the heat-absorbing air compressed in the air cycle part (11) and supplying the heat-absorbing air to the dehumidifying means (60), wherein the dehumidifying means (60) is arranged to include a humidity medium for effecting moisture absorption and release, dehumidify the heat-absorbing air through moisture absorption of the humidity medium and regenerate through moisture release of the humidity medium.

14. A refrigerating system for cooling a subject to be cooled, comprising:

an air cycle part (11) including an expander (22) for taking in a heat-absorbing air and reducing the pressure of the heat-absorbing air, a heat absorbing section (30) in which the heat-absorbing air reduced in pressure in the expander (22) absorbs heat from the subject to be cooled, and a compressor (21) for compressing the heat-absorbing air having absorbed heat in the heat absorbing section (30);

dehumidifying means (60) for dehumidifying the heat-absorbing air and then supplying the heat-absorbing air to the expander (22) of the air cycle part (11); and heating means (101) for heating the heat-absorbing air immediately prior to being compressed in the air cycle part (11), wherein the dehumidifying means (60) is arranged to include a humidity medium for effecting moisture absorption and release, dehumidify the heat-absorbing air through moisture absorption of the humidity medium and regenerate through moisture release of the humidity medium.

* * * * *

UNITED STATES PATENT AND TRADEMARK OFFICE
CERTIFICATE OF CORRECTION

PATENT NO. : 6,629,427 B1
DATED : October 7, 2003
INVENTOR(S) : Chun-cheng Piao et al.

It is certified that error appears in the above-identified patent and that said Letters Patent is hereby corrected as shown below:

<u>Title page</u>,
Item [75], Inventors, change "Chung-cheng Piao" to -- Chun-cheng Piao --;

<u>Column 23</u>,
Line 59, change "rotor m ember (61)" to -- rotor member (61) --;

Signed and Sealed this

Twenty-fourth Day of February, 2004

JON W. DUDAS
*Acting Director of the United States Patent and Trademark Office*